United States Patent [19]
Amnotte

[11] 3,832,501
[45] Aug. 27, 1974

[54] BREAK-AWAY SAFETY SWITCH MOUNTING BRACKET KIT

[76] Inventor: John J. Amnotte, Town & Country Mobile Park, Space 12, P.O. Box 2000A, Harbor, Oreg. 97415

[22] Filed: May 4, 1973

[21] Appl. No.: 357,221

[52] U.S. Cl............... 200/61.19, 188/112, 280/422
[51] Int. Cl. .......................................... H01h 27/04
[58] Field of Search..... 250/61.19, 153 M; 188/112; 340/275, 52 H; 200/161, 172 A, 61.93, 61.13, 61.18; 280/422, 428, 432

[56] References Cited
UNITED STATES PATENTS

| | | | |
|---|---|---|---|
| 1,852,778 | 4/1932 | Holanbek | 188/112 |
| 2,928,912 | 3/1960 | Molnar | 200/61.19 |
| 3,077,248 | 2/1963 | Wayt | 188/112 |
| 3,110,507 | 11/1963 | Riner | 280/422 |
| 3,274,367 | 9/1966 | Clark | 200/161 |

Primary Examiner—Robert K. Schaefer
Assistant Examiner—William J. Smith
Attorney, Agent, or Firm—Donald C. Keaveney

[57] ABSTRACT

There is disclosed an improved mounting bracket kit for providing a fail-safe actuation of the pull-plug or release pin of a conventional break-away safety switch. The bracket is suitable for use either as a retrofit to improve the reliability of operation of existing switch installations or for use with new original equipment. The mounting bracket kit is such as to provide support for both ends of a conventional pull-plug switch housing with respect to the trailer chassis and to provide a guide for the cable leading to the release pin of the switch which guide is also supported with respect to the trailer chassis and is dimensioned and positioned so that the cable guide acts as a pivot point for the cable ensuring that the pull of the cable on the release pin will be along a straight line coinciding with the longitudinal axis of the pin or plug so that the release pin will not jam in the housing if the towing vehicle and trailer assume angular relationships other than that normally intended during the break-away action. Failure of the emergency breaking mechanism due to such off-axis components of cable pull which has occurred in the past is thus obviated.

5 Claims, 3 Drawing Figures

PATENTED AUG 27 1974    3,832,501

3,832,501

BREAK-AWAY SAFETY SWITCH MOUNTING BRACKET KIT

BACKGROUND OF THE INVENTION

This invention relates to a novel mounting bracket kit for retrofit or original equipment mounting of a break-away switch to the chassis or hitchframe of a trailer type vehicle. It provides a simple and inexpensive solution of a major safety problem which has in the past been only partially recognized as existing and for which no truly effective solution has heretofore been proposed.

Break-away switches are intended to provide an immediate braking of a related trailer type vehice when it is inadvertently separated from its towing vehicle. Many of these devices place the actuation of the trailer brakes under such emergency circumstances under the control of an electrical circuit which is activated by the pulling of a plug or release pin from a sleeve in a switch housing by means of a switch actuating cable which is attached to the release pin and to the towing vehicle. These cable actuated devices have generally replaced in use such older forms of brake actuating mechanisms as the dual or outer and inner barrel arrangement shown for example in U.S. Pat. No. 1,966,977 issued July 17 1934 to J. A. Dyer. More modern forms of pull-plug actuated break-away switches are shown, for example, in U.S. Pat. No. 3,110,507 to Riner, U.S. Pat. No. 3,654,411 to Wohnlich et al., and U.S. Pat. No. 3,691,330 to Hollander.

In use it has been found that if the emergency conditions giving rise to the separation of the trailer from its towing vehicle are such as to cause the cable to pull in a direction other than the generally straight horizontal line in which it is intended to be connected, the resulting off axis or non-axial components of thrust on the pin may jam the release pin or plug in its sleeve in the housing and in extreme cases may actually pull the entire housing of a switch mounted, for example, in the manner shown in Riner out of its intended position and jam it against the trailer frame. When this happens, the brakes are not actuated since the plug is not pulled; the trailer is then not braked, but continues on often to crash into the towing vehicle which normally seeks to stop for the emergency conditions.

Wohnlich recognizes the desirability of applying forces to the plug by the cable along the longitudinal axis of the plunger and state this to be one of the objects of his invention. He attempts to meet this object by pivotally mounting a switch housing 11 to pivot about a vertical mounting bolt 27 as an axis of rotation. A pull on his cable 19 will thus indeed rotate the switch housing 11 in its horizontal plane so that the axis of the plunger 21 lies in the vertical plane defined by the pivot bolt 27 and the line of pull of the cable. This horizontal rotation does not, however, ensure that components of thrust due to displacement of the cable up or down from the horizontal plane of the trailer mount and switch housing cannot occur and thus jam the pull-plug. In facts, such deviations of the cable from the horizontal plane of the trailer bed will frequently occur due to irregularities in the road or sudden acceleration and deceleration of either the trailer or its towing vehicle.

Hollander similarly states at line 40 of column 6 and following that his arrangement will be one to substantially align the switch unit with the towed and towing vehicles so that when a pull is exerted through his cable 24 from the towing to the towed vehicle, the pull will be substantially axial in relation to the key member 42. This will indeed be the case so long as the angular relationship between the towed and towing vehicle remains that for which the equipment is designed, that is, horizontal and coplanar. If this relationship is disturbed, however, then again the cable will no longer pull in the desired axial direction but may be displaced from it sufficiently to cause off-axis components of force pulling on the key member to jam it against the sleeve from which it is intended to be pulled.

SUMMARY OF THE INVENTION

The present invention is directed to overcoming the above mentioned problems in the related art. It provides an inexpensive, compact and secure mounting bracket kit which may readily be modified to adapt itself as a retrofit kit to break-away switch housings of many different manufacturers or which may be included as part of the mounting hardware supplied by original equipment manufacturers. The kit is such as to provide for the switch housing a mounting bracket to rigidly support and attach the housing at two points with respect to a structural member of the trailer so as to define a line of pull or central axial direction for the pull-plug of the switch housing. A guide means or member is then provided which is dimensioned to receive and surround the cable connecting the pull-plug to the vehicle and which is also provided with means to rigidly support the guide member with respect to the structural member of the trailer so that it may be positioned to place the guide point (which may, for example, be the aperture in an eyelet) on the previously established central axial line of pull of the plug. The eyelet guide member thus acts as a pivot point for the cable so that no matter what the angular relationship between the trailer and the vehicle becomes under emergency conditions, any forward thrust on the cable will serve to provide a force on the pull-plug which is entirely directed along the central axis thereof so that the plug will not jam in its sleeve or bushing.

BRIEF DESCRIPTION OF THE DRAWINGS

This and other object and advantages of the invention will be more readily apparent from the detailed description below taken with the accompanying drawing in which like reference characters refer to like parts throughout and wherein.

Figure 1:
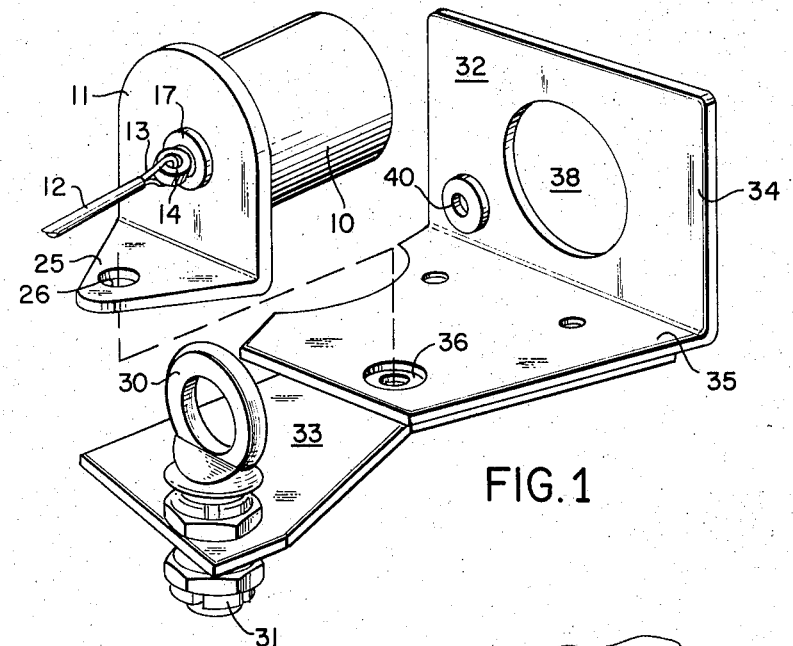
FIG. 1 is an exploded perspective view showing the relationship between a conventional or prior art break-away switch housing and the mounting bracket kit of the present invention, the two being shown in disassembled form.

Turning now to the drawing there is shown in FIG. 1 a break-away switch housing 10 which may be of any suitable configuration of the general type described above but which is here shown as being generally cylindrical in shape and being provided by the manufacturer with the usual single mounting flange 11. An actuating cable 12 has a loop 13 at one end thereof passed through an aperture in one end 14 of the release pin or pull-plug 15 which functions in a manner diagramatically illustrated in FIG. 3.

Figure 2:
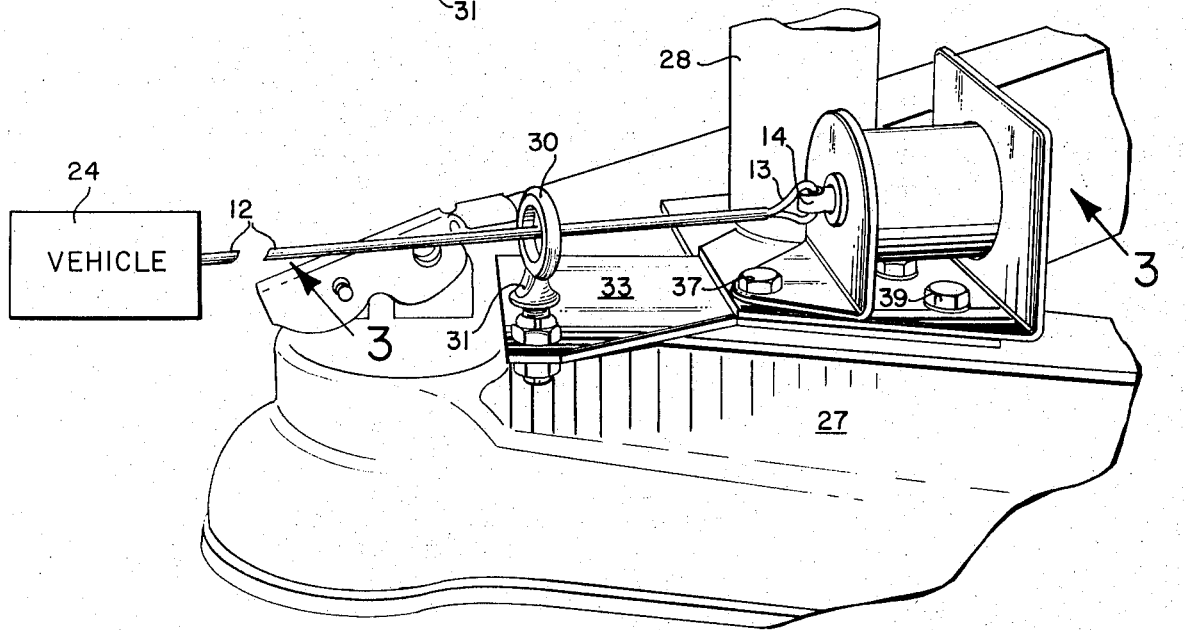
FIG. 2 is a partially schematic assembled perspective view showing the apparatus in FIG. 1 mounted on a typical trailer tongue.
Figure 3:
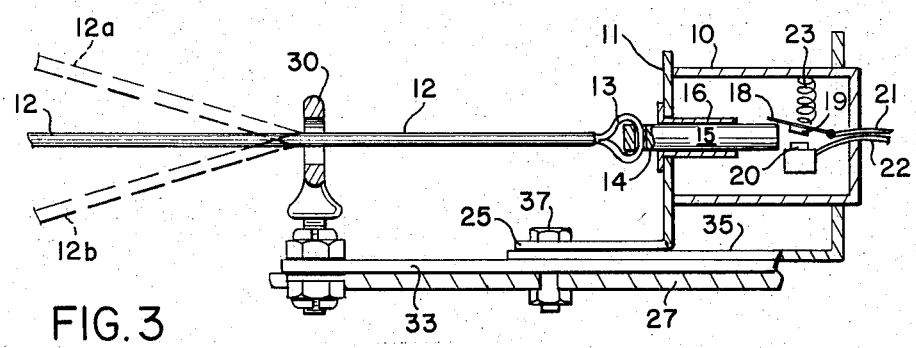
FIG. 3 is a sectional view taken on the line 3 — 3 of FIG. 2.

As may be seen in FIG. 3 the pull-plug 15 is slidably received in a snug friction fit in a sleeve or bushing 16 extending into housing 10 and secured to mounting flange 11 by a fastener 17. In its normally seated position as illustrated in FIG. 3, the inner ends of the pull-plug 15 holds a pivotally mounted spring biased switch arm 18 in the open position shown. Switch arm 18 carries a contact member 19 which is adapted to seat on a second contact member 20 when the switch 18 is closed under the action of spring 23 when pull-plug 15 is pulled forward by cable 12. Contact 19 is connected to a conductor 21 and contact 20 is connected to a conductor 22. Conductors 21 and 22 are connected in a manner well known in the art so that when the switch 18 closes contacts 19 and 20 a circuit is completed from a battery mounted on the trailer to electrically actuate the braking system for the trailer. The trailer is thus stopped provided that the pull-plug 15 is in fact pulled forward by the cable 12 when the trailer breaks away from the towing vehicle. To achieve this the cable 12 is connected from plug 15 to the vehicle 24 towing the trailer as is schematically illustrated in FIG. 2.

The mounting flange 11 of switch housing 10 is conventionally provided with a lip 25 having an aperture 26 therein by which the switch housing 10 is intended to be bolted to a frame members 27 of the trailer chassis preferably and usually near the jack post 28 thereof. When such a conventional break-away switch 10 is mounted by means of such a simple single flange and lip 11–25 as shown in FIG. 1 the pull-plug 15 will in fact only be pulled from the housing and actuate the switch 18 to set the emergency brakes as intended if by good fortune and thrust on the cable 12 is directed axially along the direction shown by the solid line position of cable 12 in FIG. 3. Should the relationship between the towing vehicle 24 and the trailer 27 being towed be changed by the emergency conditions so that, for example, the cable assumes either of the dashed line positions 12a or 12b shown in FIG. 3, then in the absence of the apparatus of the present invention including the guide member 30, the cable 12 would pull on the plug 15 in such a fashion as to jam it against the sleeve 16 in the housing 10. In extreme cases the off axis thrust on the cable 12 may be sufficient to actually bend the mounting flange 11 so that the pull-plug 15 is jammed against the trailer frame thus totally preventing removal of the plug and actuation of the brakes.

Such malfunctioning of the break-away switch is prevented by the mounting bracket assembly of this invention by providing a guide member 30 dimensioned to receive and surround the cable 12 connecting the pull-plug 15 of the break-away switch 10 to the vehicle 24. The guide member 30 is rigidly supported with respect to the structural member 27 of the trailer by any convenient means which is here shown as a mounting bolt 31 integral with the guide member 30 which here has the form of an eyelet with the cable 12 passing through the aperture therein so that it is entirely surrounded by the eyelet guide member. The guide member eyelet 30 thus serves as a pivot point constraint for the cable 12 and forces the portion of cable 12 between plug 15 and guide 30 to remain on the straight line projection of the central axis of symmetry and line of thrust of the pull-plug 15 regardless of what angle the cable 12 assumes in a direction forward of guide 30.

In order to rigidly support the housing 10 of the break-away switch with respect to the structural member 27 of the trailer in such a fashion tha this straight line projection of the central axis or thrust axis of the pull-plug 15 will pass through the eyelet 30, there is provided as may be seen in the drawing a bracket 32 and a positioning plate 33 which are dimensioned and shaped relative to the support means for the eyelet guide member 30 so as to ensure that the guide member will lie on the straight line projection of the central longitudinal pull axis of the pull-plug 15 when the housing 10 is mounted on the trailer in the bracket 32 and positioned by the plate 33 so that the cable 12 when attached to the vehicle 24 at a predetermined point and passed through the guide member 30 to the pull-plug 15 will exert a straight and purely axially directed thrust on the pull-plug regardless of the angular relationship or change of angular relationship between the attachment point on the vehicle and the guide member and regardless of the angular relationship or change of angular relationship between the trailer and the vehicle when the trailer is accidentally separated from the vehicle to thus give fail safe assurance of the actuation of the brakes of the trailer. As may be seen from the alternate cable position 12a and 12b of FIG. 3, the rigidly secured eyelet guide member 30 acts as a pivot point for the cable 12 so that irrespectively of what position the cable assumes forwardly of the guide 30 and toward the vehicle, the portion the cable 12 extending from the guide 30 to the pull-plug 15 will always remain in the horizontal position shown in FIG. 3. As may be seen in FIG. 1 the bracket 32 is perferably of an L-shaped configuration having a first vertically extending portion 34 and a second generally horizontally extending portion 35. The two portions of the L-shaped bracket are integral with each other and extend generally perpendicularly to each other. The second portion 35 is provided with means such as the mounting aperture 36 to attach it to the structural member 27 as by a nut and bolt arrangement 37.

The first portion 34 of the bracket 32 extends in a generally upright direction and is provided with an aperture 38 which is shaped and dimensioned to receive the housing 10 of the break-away switch. It will of course be understood that although the housing is here illustrated for convenience as having a cylindrical shape requiring a circular aperture 38, the bracket can readily be modified to accomodate a switch housing of any desired. cross section whether square, rectangular or otherwise. The aperture 38 is shaped and dimensioned to receive the switch housing 10 and is positioned in the upright portion 34 of the L-bracket at a height such that the longitudinal axis of pull-plug 15 (which is mounted in the front end of the break-away switch housing which is conventionally supported by the flange 11) will extend in a direction generally parallel to the assumed horizontal direction of the trailer frame member 27. That is to say, the distance from the bottom surface of the lip 25 to the center line of the plug 15 should be the same as the distance from the top surface of the portion 35 of bracket 32 to the center of the aperture 38 where, as shown, the pull-plug is mounted in the center of a cylindrical switch housing 10.

A positioning plate 33 is preferably provided to maintain the longitudinal spacing between the guide member 30 and the mounting bracket assembly for the switch housing 10 and to give added rigidity to the assembly The positioning plate 33 is apertured at its forward end to receive the bolt of the annular eyelet guide member 30 and is also apertured at its rearward end to receive the mounting bolt 37 which, when the device is assembled, passes through the aperture 26 in the lip 25 of flange 11 which rests on top of the portion 35 of the L-bracket the aperture 36 of which is alligned with the aperture 26 and both of which are in turn aligned with the aperture at the rear of the positioning plate 33. One side of the horizontal portion 35 of the L-bracket 32 may be recessed in a circular arc to permit it to be positioned against the jack post 28 if desired. The upright portion 34 of the bracket 32 is also provided with an aperture 40 through which the conductors 21 and 22 from the switch housing 10 may be passed if necessary in a particular installation.

Although it is often convenient for purposes of flexibility of mounting to various configurations of trailer chassis to provide the mounting bracket assembly in three separate pieces as shown, it will of course be understood that a single U-shaped bracket can be utilized and that any shape which positions the switch housing 10 so that it is held in horizontal alignment with a pivot guide point member 30 by supporting the housing 10 at two points to provide a straight line of thrust through the guide point 30 may be used. Thus, if the L-bracket 32, the positioning plate 33, and the guide member 30 are formed of a single or welded piece or pieces a generally U-shaped bracket results which performs the same function as is described above.

In either configuration the switch is assembled as follows.

The positioning plate 33 and guide 30 are first bolted to the trailer structural or frame member 27 by the bolt 31 of the annular guide member 30. The pre-drilled hole in the rear of the positioning plate 33 then indicates the point at which to drill in the trailer chassis member 27 to provide a hole therein to receive the bolt 37. Bracket 32 is then positioned using supplemental bolts 39 if desired. Break-away safety switch 10 is then placed in the aperture 38 of upright portion 34 of bracket 32 and the mounting flange 11 on the front end of the switch 10 is secured by passing bolt 37 through apertures 26 and 36 and through a mating aperture drilled in the trailer frame member 27.

Finally the break-away safety switch emergency brake cable release pin 15 is inserted into the housing 10 and specifically into the sleeve 16 therein with the cable 12 connected by loop 13 to the end 14 of the pin 15. The cable 12 is then run through the annular eyelet guide member 30 and connected to the desired point on the towing vehicle 24. The mounting bracket assembly will then assure failsafe actuation of the trailer brake system under any direction or angle of thrust of the cable 12 which has a component extending forwardly from the pivot point at guide member 30 in the manner and for the reasons discussed in detail above.

What I claim is:

1. A mounting bracket assembly for a cable operated pull-plug type of break-away switch for fail-safe emergency actuation of the brakes of a vehicle towed trailer upon accidental separation of said vehicle and said trailer regardless of the direction of pull resulting therefrom, said assembly comprising:
   a. a guide member dimensioned to receive and surround the cable connecting the pull-plug of said break-away switch to said vehicle;
   b. first means to rigidly support said guide member with respect to a structural member of said trailer;
   c. second means to rigidly support the housing of said break-away switch with respect to said structural member of said trailer; said second means including means to support both the front and back end of said switch housing to rigidly support said housing with respect to said structural member of said trailer, said pull-plug being located in said front end and said front end being positioned between a support member for the back end of said housing and said guide member, the support members for the front and back end of such switch housing serving to maintain the central longitudinal pull-axis of said pull-plug in alignment with said guide member; and
   d. said first and second support means being so dimensioned relative to each other as to position said guide member on the straight line projection of the central longitudinal pull-axis of said pull-plug so that said cable when attached to a predetermined point on said vehicle and passed through said guide to said pull-plug will exert a straight purely axially directed thrust on said pull-plug regardless of the angular relationship or change or angular relationship between said predetermined point on said vehicle and said guide member and regardless of the angular relationship or change of angular relationship between said trailer and said vehicle when said trailer is accidentally separated from said vehicle to thereby ensure actuation of the brakes of said trailer.

2. Apparatus as in claim 1 wherein said guide member is an annular eyelet and wherein said first means to support said guide member is a mounting bolt integral with said eyelet.

3. Apparatus as in claim 1 wherein said second means to rigidly support the housing of the break-away switch comprises an L-shaped bracket having first and second portions integral with each other and extending perpendicularly to each other, said second portion having means to attach it to said structural member of said trailer and said first portion extending in an upright direction and having an aperture therein shaped and dimensioned to receive one end of said break-away switch housing.

4. Apparatus as in claim 3 wherein said guide member is an annular eyelet having a mounting bolt integral therewith and having a positioning plate apertured at one end to receive said bolt and apertured at the other end to be connected to said second portion of said L-shaped mounting bracket.

5. Apparatus as in claim 4 wherein said second portion of said L-shaped bracket is apertured to receive a mounting bolt to connect it to said positioning plate for said guide member and to a flange on the other end of said break-away switch housing when said one end thereof is received in the aperture in the L-shaped bracket, said pull plug being mounted in the end of said break-away switch housing which is supported by said flange and thereby being positioned and supported between the first upright portion of the L-shaped bracket supporting the other end of said switch housing and said eyelet guide member.

* * * * *